Patented July 31, 1951

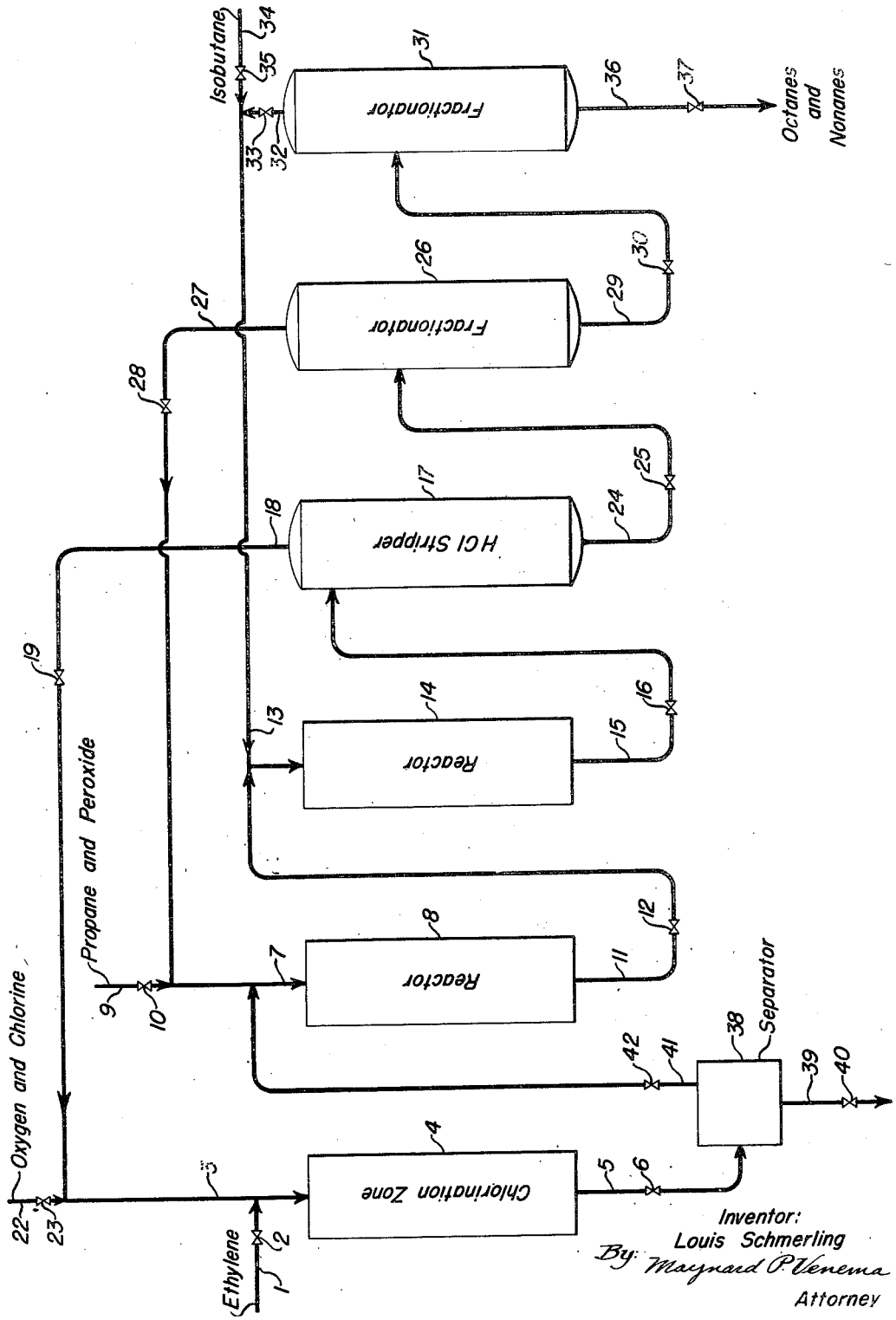

2,562,217

UNITED STATES PATENT OFFICE 2,562,217

COMBINATION PROCESS FOR THE PRODUCTION OF SATURATED HYDROCARBONS

Louis Schmerling, Riverside, Ill., assignor to Universal Oil Products Company, Chicago, Ill., a corporation of Delaware Application May 29, 1947, Serial No. 751,312

12 Claims. (Cl. 260—683.4)

This invention relates to the conversion of saturated hydrocarbons into higher boiling saturated hydrocarbons. More specifically, it is concerned with a combination of specific processes which individually involve the use of special catalysts at particular conditions of operation whereby saturated hydrocarbons may be effectively converted into higher boiling saturated hydrocarbons.

In one embodiment my invention relates to a process which comprises reacting a saturated hydrocarbon with a polyhalomonoolefin at condensation conditions in the presence of a peroxy compound condensation catalyst to thereby form a haloolefin containing a greater number of carbon atoms than either of the reactants, and reacting the last-named haloolefin with an alkylatable saturated hydrocarbon at condensation conditions in the presence of a Friedel-Crafts metal halide condensation catalyst to thereby form a saturated hydrocarbon of greater molecular weight than the first-named saturated hydrocarbon.

In a more specific embodiment, my invention relates to a process for the conversion of straight chain paraffin to higher boiling branched chain paraffins which comprises reacting a straight chain paraffin containing more than two carbon atoms with a polyhalomonoolefin in the presence of a peroxy compound condensation catalyst at a temperature at least as high as the decomposition temperature of the catalyst and at a pressure such that a substantial portion of the reactants are in the liquid phase to thereby form a haloolefin containing a greater number of carbon atoms than either of the reactants, and reacting the last-named haloolefin with an isoparaffin in the presence of a Friedel-Crafts metal halide condensation catalyst at a temperature of from about −30° C. to about 100° C. and at a pressure sufficient to maintain a substantial portion of the reactants in the liquid phase to thereby form a saturated hydrocarbon of greater molecular weight than the first-named saturated hydrocarbon.

In a still more specific embodiment my invention relates to a process which comprises halogenating a monoolefin to form a polyhalomonoolefin, reacting the resultant polyhalomonoolefin with a saturated hydrocarbon in the presence of a peroxy compound condensation catalyst at a temperature at least as high as the decomposition temperature of said catalyst and at a pressure such that a substantial portion of the reactant are in the liquid phase to thereby form a haloolefin containing a greater number of carbon atoms than the reactants, reacting the last-named haloolefin with an isoparaffin in the presence of a Friedel-Crafts metal halide condensation catalyst at a temperature of from about −30° C. to about 100° C. and at a pressure sufficient to maintain a substantial portion of the reactants in the liquid phase to thereby form hydrogen halide and a saturated hydrocarbon of greater molecular weight than the first-named saturated hydrocarbon, separating the hydrogen halide oxidizing the same to liberate halogen therefrom, and utilizing said halogen to halogenate additional quantities of monoolefin.

A simple method of converting low boiling straight chain paraffins such as normal butane and, particularly, propane, into less volatile, branched chain hydrocarbons suitable for use in motor fuels has been sought for a long time. Such methods as have been found generally have involved the use of drastic operating conditions, because of the relatively low order of reactivity of these compounds, or they have involved the use of stoichiometric amounts of "catalyst" which made such processes economically unattractive.

One of the principal applications of the process herein disclosed is in the conversion of compounds such as propane into higher molecular weight saturated hydrocarbons of high antiknock rating that are suitable for use in motor fuel. For example, propane is condensed with trichloroethylene in the presence of a catalytic amount of a peroxide to yield a dichloropentene and hydrogen chloride, and the dichloropentene is then reacted with isobutane in the presence of a Friedel-Crafts metal halide catalyst such as aluminum chloride to yield hydrogen chloride and branched chain nonanes and octanes. The reaction probably proceeds as follows:

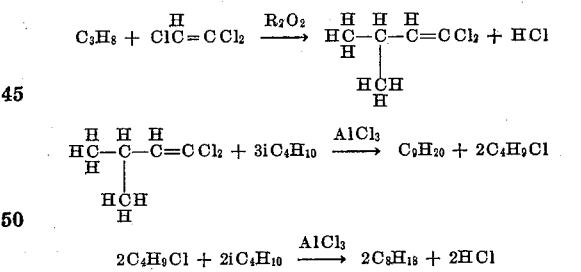

The over-all reaction amounts to:

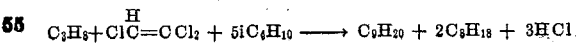

Under some operating conditions the primary products (octanes and nonanes) undergo further reaction (e. g., destructive alkylation) and are converted to branched chain pentanes, hexanes, heptanes, etc. This method of converting propane and other difficultly reactable straight chain paraffins into high octane number motor fuel components is characterized by attractive yields and mild operating conditions.

It will be noted from the above equations, that one molecule of polyhaloolefin reacts with more than one molecule of a saturated hydrocarbon. This characteristic of my process is important when a refiner has an excess of alkylatable hydrocarbons with respect to the available alkylating agents, which usually are olefins. By halogenating the olefins, and reacting the resultant haloolefins and saturated hydrocarbons in accordance with my process, and oxidizing the hydrogen halide to halogen for reuse in the halogenation step, it is possible to convert several molecules of the alkylatable hydrocarbon to higher boiling hydrocarbons for each molecule of olefin consumed; whereas if ordinary alkylation of the alkylatable hydrocarbon and the olefin were employed, only one molecule of the alkylatable saturated hydrocarbon would be converted per molecule of olefin.

Still another advantage of my process lies in the fact that it offers a convenient method of utilizing ethylene in the production of saturated motor fuel components. Ethylene is difficult to use successfully as an alkylating agent in some of the more important alkylation processes such as those employing hydrogen fluoride or sulfuric acid. However, by halogenating it, it can be made to react with saturated hydrocarbons in accordance with the process outlined herein.

Haloolefins that may be reacted with saturated hydrocarbons in the presence of peroxy compound condensation catalysts consist of polyhalomonoolefins such as symmetrical and unsymmetrical dihaloethylenes, trihaloethylenes, tetrahaloethylenes, 1,2-dihalo-1-propenes, and 1,2-dihalocyclohexenes. It will be noticed that the haloolefin may be either of the open chain or cyclic variety. All of the various types of haloolefins herein mentioned are operable in the present process, but they are not necessarily equivalent. The preferred type of haloolefins are the polyhalomonoolefins in which neither of the doubly bonded carbon atoms has more than one hydrogen atom attached thereto: the particularly preferred compounds of this class are those in which each of the doubly bonded carbon atoms has at least one halogen atom attached thereto, such as symmetrical dichloroethylene, 1,2-dichloro-1-propene, and trichloroethylene. Haloolefins with this structure are preferred because their reactions with saturated hydrocarbons are easily controlled and because they give good yields of the desired products. Haloolefins, such as vinylidene chloride, which contain the $H_2C=C<$ grouping, are less useful when simple condensation products are desired because of the ease with which high molecular weight products are formed.

The use of the term "polyhalomonoolefins" is meant to include not only polychloro-, polybromo-, plyfluoro-, and polyiodomonoolefins, but also polyhalomonoolefins containing different halogen atoms such as chlorobromoolefins. In general, the chloro compounds are preferred for reasons of economy and because yields are usually more satisfactory.

The saturated hydrocarbons that are condensable with haloolefins in the presence of peroxy compounds in my process comprise paraffins and cycloparaffins such as propane, normal butane, isobutane, normal pentane, isooctane, cyclohexane, methylcyclohexane, and the like. Among the paraffins, those containing more than two carbon atoms are preferred because methane and ethane are quite unreactive and, in general more severe operating conditions are required to cause them to condense with haloolefins in accordance with my invention. Among the cycloparaffins, those containing at least five carbon atoms in the ring are preferred because of the lesser stability of the cyclopropanes and cyclobutanes.

The catalysts that may be used in the present process comprise peroxy compounds, by which is meant any compound capable of inducing the condensation of saturated hydrocarbons with haloolefins and which contains the bivalent radical —O—O—. Examples of such compounds are the alkali metal and ammonium persulfates, perborates, and percarbonates; paracetic acid, persuccinic acid, dimethyl peroxide, diethyl peroxide, methyl ethyl peroxide, di-tertiary-butyl peroxide, dipropyl peroxide, acetyl benzoyl peroxide, acetyl peroxide, propionyl peroxide, butyryl peroxide, lauroyl peroxide, benzoyl peroxide, tetralin peroxide, urea peroxide, tertiary butyl perbenzoate, tertiary butyl hydroperoxide, and methylcyclohexyl hydroperoxide. The organic peroxy compounds constitute a preferred class of catalysts for use in this invention. Mixtures of peroxy compound catalysts may be employed. The peroxy compounds used as the catalyst may be formed by peroxidizing a portion of the hydrocarbon charge or other hydrocarbon. Only catalytic amounts, i. e., less than stoichiometric amounts need be used in my process.

The alkylatable saturated hydrocarbons that are condensed with the haloolefins, produced as intermediate products in my process, comprise isobutane, isopentane, isohexane, methylcyclohexane, etc. Isobutane is preferred.

The operation and advantages of my process will be more apparent from the following description of the attached drawing which shows diagrammatically one type of apparatus in which the process of my invention may be conducted. In this illustration ethylene is chlorinated and the resultant polychloroethylenes are condensed with propane in the presence of an organic peroxide condensation catalyst. The higher molecular weight haloolefins thus produced are condensed with isobutane in the presence of aluminum chloride to produce octanes, nonanes, and hydrogen chloride as primary products. The hydrogen chloride is oxidized to chlorine, which is utilized in the chlorination step. The unconverted propane and isobutane are separated from the products and recycled to the appropriate reaction zones. For simplification, equipment such as heat exchangers, condensers, reboilers, reflux lines, etc., which are not essential to the understanding of the description, have been omitted from the drawing.

Referring now to the drawing, ethylene is passed through line 1 containing valve 2 into line 3 wherein it is commingled with a stream of oxygen and recycle hydrogen chloride, produced as hereinafter described. The resultant mixture is passed into chlorination zone 4 which contains an oxidation catalyst and which is maintained at a temperature of from about 250 to about 600° C. The reactions which take place in the chlorination zone may be represented by the following equations:

(1) $CH_2=CH_2 + HCl + 0.5O_2 \longrightarrow CHCl=CH_2 + H_2O$
(2) $CH_2=CH_2 + 2HCl + 1.0O_2 \longrightarrow CHCl=CHCl + 2H_2O$
(3) $CH_2=CH_2 + 3HCl + 1.5O_2 \longrightarrow CHCl=CCl_2 + 3H_2O$
(4) $CH_2=CH_2 + 4HCl + 2.0O_2 \longrightarrow CCl_2=CCl_2 + 4H_2O$ It can be seen from the equation that in order to obtain polychlorination of the ethylene, more than one mol of hydrogen chloride and more than 0.5 mol of oxygen per mol of ethylene should be charged to the chlorinator. Further the degree of chlorination may be controlled by regulating the relative amounts of the reactants. Practically all of the oxidation catalysts known in the art are effective, at least to some degree, in promoting this reaction. In general, I prefer to use metal or metal compounds such as oxides or salts. The preferred catalysts are oxides or compounds of copper, iron, or bismuth and such catalysts may be deposited on refractory supports such as pumice, silica gel, alumina gel, fire brick, or the like.

Although the method of chlorination described above is preferred because of its relative simplicity, I do not mean to be limited to this particular method of producing polychloro monoolefins from monoolefins. Other methods that may be employed involve the oxidation of the recycle hydrogen chloride to chlorine by means such as the Deacon process and subsequent utilization of the chlorine in the preparation of the polychloromonoolefins. Such subsequent chlorinations may involve direct chlorination of the olefins or addition of the chlorine to the double bond followed by further chlorination of the polychloroparaffin with subsequent partial dehydrochlorination.

The effluent from chlorination zone 4, which comprises chiefly polychloroethylene and water together with possible small amounts of olefins, hydrogen chloride, and oxygen, is passed through line 5 containing valve 6 into separation means 38. The substances other than the polychloroethylenes are removed via line 39 containing valve 40. The unreacted hydrogen chloride, monoolefins, or monochlorinated olefins may be recycled to the chlorination zone by means not shown on the drawing. The polychloroethylenes are removed from separation means 38 via line 41 containing valve 42 and are passed into line 7 through which is flowing a stream of propane. The commingled mixture in line 7 is passed into reactor 8. Propane and for example, di-t-butylperoxide, the latter in catalytic amounts, are passed into line 7 through line 9 containing valve 10.

In reactor 8, propane is condensed with the polychloroethylenes to form chloropentenes and hydrogen chloride. The temperatures employed in the reactor should be at least as high as the initial decomposition temperature of the peroxy compound used as the catalyst. In the case of tertiary butyl perbenzoate, for example, the decomposition temperature is sharply defined and is approximately 115° C. Di-t-butyl peroxide decomposes at about 130–140° C. On the other hand, certain peroxy compounds, such as benzoyl peroxide, decompose over a relatively wide temperature range. Usually little advantage is gained if the reaction is conducted at a temperature more than about 150° C. higher than the decomposition temperature of the catalyst. Condensation of the propane with the dichloroethylenes can be accomplished in reactor 8 when the reactants are in the vapor phase. However, liquid phase operation is preferred, consequently the pressure at which the reaction is conducted will be chosen accordingly. The residence times within reactor 8 may be within the range of from slightly less than 1 minute to several hours. However, residence times of at least several minutes usually are preferred. In order to minimize polymerization of the polychloroethylenes, it is desirable to maintain an excess of propane over said polychloroethylenes in the reaction zone.

The effluent from reactor 8, which comprises chloropentenes, propane, hydrogen chloride and possibly some polychloroethylenes, is passed through line 11 containing valve 12 and into line 13 wherein it contacts a stream of isobutane and thence into reactor 14. The unconverted propane in the effluent from reactor 8 could be separated and returned to the reactor for further reaction. Similarly, the hydrogen chloride could be separated and returned to the chlorination zone. The relatively small amounts of products of the decomposition of the peroxide might also be separated. However, these separation steps are expensive and, inasmuch as the presence of propane and hydrogen chloride do not detrimentally affect subsequent steps in my process, it is usually more convenient to permit them to remain in the effluent and to separate them in subsequent operations.

In reactor 14, the haloolefins produced in reactor 8 are condensed with isobutane in the presence of Friedel-Crafts metal halide condensation catalysts, including boron fluoride, to produce saturated hydrocarbons and hydrogen chloride. The Friedel-Crafts halides, which give the best yields, are aluminum chloride, aluminum bromide, zirconium chloride, and boron fluoride. Aluminum chloride is preferred. The catalyst in reactor 14 may be employed in the granular form, supported on carriers such as activated alumina or activated charcoal, as a liquid complex with hydrocarbons, dissolved in a suitable solvent such as nitromethane, or as an addition complex such as aluminum chloride monomethanolate. The temperature within reactor 14 usually will lie within the range of from about −30° C. to about 100° C.; the pressure will be such that a substantial portion of the reactants are in the liquid phase. The residence times employed may lie within the range of from slightly less than 1 minute to several hours, but they will usually be at least several minutes. A molecular excess of isobutane over the haloolefin is preferred in order to minimize undesirable side reactions of the haloolefins.

The effluent from reactor 14, comprising primarily nonanes, octanes, isobutanes, propane, and hydrogen chloride, is removed through line 15 containing valve 16 and is passed into hydrogen chloride stripper 17. Hydrogen chloride is removed overhead from the stripper through line 18 containing valve 19 and is passed into line 3 and chlorination zone 4. Oxygen and makeup chlorine is added to the system as needed through line 22 containing valve 23.

The hydrogen chloride-free bottoms from stripper 17 are removed via line 24 containing valve 25 and are passed into fractionator 26. Propane is removed overhead from fractionator 26 through line 27 containing valve 28 and is passed into line 7 and thence into reactor 8. Bottoms from fractionator 26 are withdrawn through line 29 containing valve 30 and are passed into fractionator 31. Isobutane is removed overhead from this fractionator through line 32 containing valve 33 and is recycled to reactor 14 via line 13. Isobutane is added to the process via line 34 containing valve 35. Octanes and nonanes are removed from the bottom of fractionator 31 by means of line 36 containing valve 37.

From the foregoing description it can be seen that by means of my process I have converted ethylene, propane, and isobutane into branched chain octanes and nonanes with substantially no consumption of chlorine and at the expense of only catalytic amounts of peroxide and aluminum chloride.

I claim as my invention:

1. A process which comprises catalytically reacting a saturated hydrocarbon containing more than two carbon atoms with a polychloromonoolefin in the presence of a catalytic amount of a peroxy compound condensation catalyst and a molecular excess of the saturated hydrocarbon at a temperature at least as high as the decomposition temperature of said catalyst and a pressure such that a substantial portion of the reactants are in the liquid phase to thereby form hydrogen chloride and a chloroolefin containing a greater number of carbon atoms than either of the reactants, and reacting the thus-produced last-named chloroolefin with an isoparaffin in the presence of a Friedel-Crafts metal halide condensation catalyst at a temperature of from about −30° C. to about 100° C. and at a pressure sufficient to keep a substantial portion of the reactants in the liquid phase to thereby form a saturated hydrocarbon of greater molecular weight than the first-named saturated hydrocarbon.

2. The process of claim 1 further characterized in that the polychloromonoolefin is one in which each of the doubly bonded carbon atoms has at least one chlorine atom attached thereto.

3. The process of claim 1 further characterized in that the polychloromonoolefin is one in which neither of the doubly bonded carbon atoms has more than one hydrogen atom attached thereto.

4. The process of claim 2 further characterized in that said polychloromonoolefin in which each of the doubly bonded carbon atoms has at least one chlorine atom attached thereto is a polychloroethylene.

5. The process of claim 3 further characterized in that said polychloromonoolefin in which neither of the doubly bonded carbon atoms has more than one hydrogen atom attached thereto is a polychloroethylene.

6. A process for the conversion of paraffins to higher boiling branched paraffin which comprises catalytically reacting a paraffin containing more than two carbon atoms with a polychloromonoolefin in the presence of a catalytic amount of a peroxy compound condensation catalyst and a molecular excess of the paraffin at a temperature at least as high as the decomposition temperature of the catalyst and a pressure such that a substantial portion of the reactants are in the liquid phase to thereby form hydrogen chloride and a chloroolefin containing a greater number of carbon atoms than either of the reactants, and reacting the thus-produced last-named chloroolefin with an isoparaffin in the presence of a Friedel-Crafts metal halide condensation catalyst at a temperature of from about −30° C. to about 100° C. and at a pressure sufficient to keep a substantial portion of the reactants in the liquid phase to thereby form a saturated hydrocarbon of greater molecular weight than the first-named paraffin.

7. The process of claim 6 further characterized in that the paraffin is isobutane.

8. A process for the conversion of straight chain paraffins to higher boiling branched chain paraffins which comprises catalytically reacting a straight chain paraffin containing more than two carbon atoms with a polychloromonoolefin in the presence of a catalytic amount of a peroxy compound condensation catalyst and a molecular excess of the straight chain paraffin at a temperature at least as high as the decomposition temperature of the catalyst and a pressure such that a substantial portion of the reactants are in the liquid phase to thereby form hydrogen chloride and a chloroolefin containing a greater number of carbon atoms than either of the reactants, and reacting the thus-produced last-named chloroolefin with an isoparaffin in the presence of a Friedel-Crafts metal halide condensation catalyst at a temperature of from about −30° C. to about 100° C. and at a pressure sufficient to keep a substantial portion of the reactants in the liquid phase to thereby form a saturated hydrocarbon of greater molecular weight than the first-named paraffin.

9. The process of claim 8 further characterized in that the polychloromonoolefin is a polychloromonoolefin in which each of the doubly bonded carbon atoms has at least one halogen atom attached thereto.

10. The process of claim 9 further characterized in that the straight chain paraffin is propane.

11. The process of claim 9 further characterized in that the straight chain paraffin is normal butane.

12. The process of claim 9 further characterized in that the straight chain paraffin is normal pentane.

LOUIS SCHMERLING.

REFERENCES CITED

The following references are of record in the file of this patent:

UNITED STATES PATENTS

| Number | Name | Date |
|---|---|---|
| 2,327,174 | Cass | Aug. 17, 1943 |
| 2,353,766 | Schmerling | July 18, 1944 |
| 2,366,716 | Frey | Jan. 9, 1945 |
| 2,396,217 | Vaughan et al. | Mar. 5, 1946 |

OTHER REFERENCES

Webster's New International Dictionary, 2nd ed., unabridged (1939), page 673, "Deacon Process."